United States Patent [19]

McDowell

[11] 4,098,085
[45] Jul. 4, 1978

[54] FLOW CONTROL VALVES

[75] Inventor: Peter Vincent McDowell, Huddersfield, England

[73] Assignee: Holset Engineering Company Limited, Huddersfield, England

[21] Appl. No.: 665,011

[22] Filed: Mar. 8, 1976

[30] Foreign Application Priority Data

Mar. 13, 1975 [GB] United Kingdom ............... 10416/75

[51] Int. Cl.² .................... F02D 23/00; F16K 15/03
[52] U.S. Cl. ........................................ 60/600; 60/602; 137/527; 137/535
[58] Field of Search ............ 137/527, 543.15, 533.27, 137/535, 536, 527.2, 527.6, 527.4, 115; 417/380, 405; 251/337; 60/600, 602, 611

[56] References Cited

U.S. PATENT DOCUMENTS

| 627,390 | 6/1899 | Cash | 137/535 |
|---|---|---|---|
| 2,021,532 | 11/1935 | Wainford | 137/527.2 X |
| 2,351,817 | 6/1944 | Johnson | 137/536 X |
| 2,767,735 | 10/1956 | Darling | 137/527 |
| 3,123,092 | 3/1964 | Kmiecik et al. | 137/536 X |
| 3,270,495 | 9/1966 | Connor | 417/380 X |

FOREIGN PATENT DOCUMENTS

| 706,240 | 3/1931 | France | 137/535 |
|---|---|---|---|
| 1,036,573 | 4/1953 | France | 137/535 |
| 1,043,112 | 9/1966 | United Kingdom. | |

Primary Examiner—William R. Cline
Attorney, Agent, or Firm—Gary M. Gron; Robert T. Ruff

[57] ABSTRACT

The disclosure illustrates a flow control bypass valve for a turbine housing. The valve comprises a closure member biased into engagement with a valve seat to block flow and mounted to swing out of engagement with the seat when a given turbine inlet pressure is exceeded thereby bypassing hot gas flow around the turbine. The mounting arrangement for the closure member is insensitive to build up of hot gas deposits and does not significantly increase the overall envelope of the turbine housing.

10 Claims, 8 Drawing Figures

FLOW CONTROL VALVES

The present invention relates to flow control valves and is particularly concerned with flow control valves wherein the valve closure member has a support means, at least a part of which is, in use, subject to contact with hot gases.

Conventional flow control valves usually have a closure member which is carried by an axially displaceable support means biassed such that the closure member is normally urged into engagement with a fixed valve seat. For example, one type of known flow control valve is of the poppet type and includes a circular closure member mounted on one end of a stem which is axially slidable within a cylindrical guide and is spring biassed so as to urge the closure member against a fixed, circular valve seat. When the gas pressure upstream of the valve seat increases above a predetermined value, the closure member is axially displaced away from the seat against the biassing force whereby to allow gases to flow therethrough.

A disadvantage of the aforegoing type of valve is that, where hot gases are being controlled by the valve, at least the part of the valve stem adjacent the closure member is contacted by the hot gases, particularly when the valve is open, and hence is subject to corrosion or build up of deposits which can lead eventually to sticking and malfunctioning of the valve due to the fact that this part of the stem is no longer able to slide freely in the cylindrical guide.

One situation where this problem has been encountered is in turbochargers for internal combustion engines in which the hot exhaust gases from the engine are utilized to drive a turbine which in turn drives a compressor for increasing the charge of air supplied to the engine cylinders. An example of the use of a poppet type relief valve in such a turbocharger is described in detail in British patent specification No. 2,043,112.

An additional problem with a poppet valve of this type is that its stem, associated guides and spring elements project from the turbine housing to such an extent that they significatnly add to the overall envelope of the tubocharger.

A broad object of the present invention is to provide a flow control valve for use in controlling hot gases which is less subject to malfunctioning as a result of corrosion or build up of deposits on the support for a closure member used to control flow.

A more specific object is to provide a flow control valve for a hot gas driven-turbine wherein the valve has a minimum effect on the overall size of the turbine.

In accordance with the present invention, the closure member is mounted so as to be angularly displaceable about a point or axis located laterally of the closure member.

Preferably, the angular displacement of the closure member takes place in a plane perpendicular to that containing the valve seat.

By virtue of the aforegoing construction, the point or axis about which the closure member is angularly displaceable can be located out of the direct flow path of hot gases passing through the valve when open and the sliding surfaces of the prior construction which were subject to sticking can be eliminated.

The angular displacement of the closure member may be achieved in the form of a pivotal movement about a fixed axis, for example by mounting the closure member on a rocker arm torsionally biased to urge the closure member against the valve seat. In other embodiments, it may be achieved by mounting the closure member on one end of a flexible member whose other end is fixed, for example a leaf spring.

The invention is described further hereinafter, by way of example, with reference to the accompanying drawings, in which:

FIG. 6 is a partially sectioned side elevation of a fourth embodiment of a flow control valve constructed in accordance with the present invention and mounted on a turbocharger housing.

Figure 1:
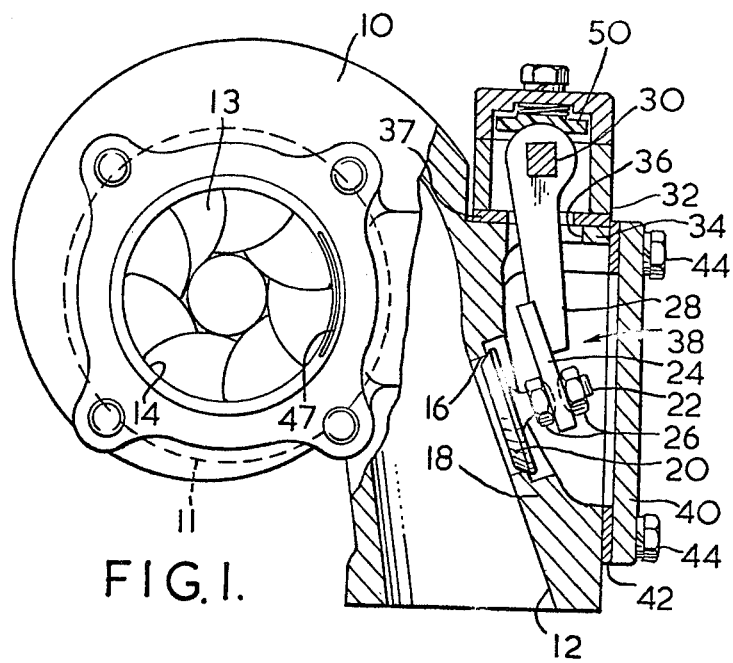
FIG. 1 is a partially sectioned side elevation of one embodiment of a flow control valve constructed in accordance with the present invention and mounted on a turbocharger housing.

The illustrated flow control valve is mounted on the turbine housing 10 of a turbocharger. In each case, the housing 10 has an intake passage 12 by way of which hot exhaust gases from an internal combustion engine are led to a turbine wheel or rotor 11 carrying a plurality of vanes 13. The turbine 11 is usually connected to a compressor (not shown) to pressurize air for delivery to the internal combustion engine. The housing 10 has an outlet area 14 which permits the exit of spent gases from the turbocharger and may be connected to an exhaust pipe (not shown) communicating with the atmosphere. Thus, high pressure gases entering the turbine at the intake passage 12 are expanded through the turbine wheel causing rotation thereof, the spent gases being discharged through the turbine discharge passage 14.

The flow control valves are utilized for the purpose of providing a bypass path for exhaust gases upstream of the turbine wheel when the pressure of these gases exceeds a predetermined value. This in turn limits the rotational speed of the turbine 11, thus controlling the output pressure of the compressor to a safe maximum level.

Figure 2:
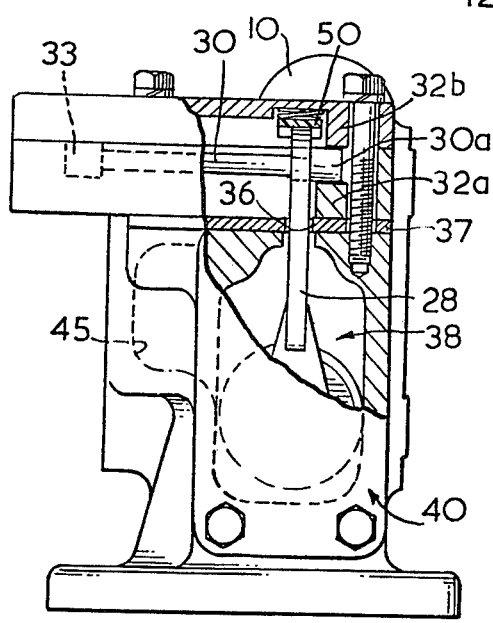
FIG. 2 is a partially sectioned front view of the embodiment of FIG. 1.

The flow control valve of FIGS. 1 and 2 includes a circular valve seat 16 formed in the side wall 18 of the intake passage 12 of the housing 10 and a correspondingly shaped closure member 20 have a rearwardly extending, central, screwthreaded stud 22 which extends through an aperture in a plate 24 and is attached to this plate by means of a pair of nuts 26. The nuts 26 may seat in spherical seatings in plate 24 to permit adjustment for proper seating of closure member 20. The plate 24 is carried by one end of a rocker arm 28 whose other end is keyed onto the free end of a torsion bar 30 mounted within a subsidiary housing 32, the housing 32 being supported on a flanged part 34 of the main housing 10. The subsidiary housing 32 communicates with the interior of the flanged part 34 of the main housing by way of an aperture 36 and a gasket 37 through which the rocker arm 28 extends with a substantial clearance as illustrated.

As shown in FIG. 2, the free end 30a of the torsion bar 30 is journalled in a bearing formed by opposing halves 32a, 32b of the subsidiary housing 32, the other end being fixed relative to the housing 32 at 33 by means of a rectangular or square cross section received in a corresponding recess formed in housing 32 to prevent relative rotation. The "wind up" of the torsion bar is arranged to bias the closure member 20, by way of the rocker arm 28 and plate 24, into engagement with the valve seat 16 under normal circumstances. When an excessive pressure builds up in the intake passage 12, the closure member is angularly displaced about the axis of the torsion bar 30 and against the torque of the torsion bar whereby to open the valve and allow the intake passage to communicate with a chamber 38 formed between the interior surfaces of the flanged part 34 of the housing 10 and a cover plate 40 fixed across the open mouth of the flanged part 34, with a gasket 42 therebetween, by bolts 44. The chamber 38 also communicates, by way of a passage 45, with an opening 47 in the outlet 14 of the housing 10 whereby to connect the intake passage 12 to atmosphere when the valve is open.

It will be observed that the torsion bar 30 located in the subsidiary housing 32 is remote from the bypass passage for the gases so that it is not itself in contact with a "flow" of gases. There will of course be gases present in the subsidiary housing 32 but they will be relatively static. The clearance between the rocker arm 28 and the gasket 37 is relatively large so that a build up of deposits on the arm 28 does not prevent the valve from operating.

A further advantage of the present embodiment is that damping forces are inherent in its construction and are effective to prevent any tendency for the valve to flutter on its seat which could cause damage to the closure member or seat and eventual breakdown. This is of particular importance in view of the pulsating nature of the gas flow in the turbine housing. The damping forces are created by the torsion bar 30 being spring loaded against its free end bearing and are proportional to the torsion bar "wind up".

The design of the valve also permits additional damping to be readily built in. For example, the embodiment of FIGS. 1 and 2 includes a damping pad 50 located between the rocker arm 28 and the subsidiary housing 32 whereby to damp the movement of the arm 28 and hence the movement of the closure member 20.

In an alternative embodiment, the construction can be identical to that of FIGS. 1 and 2 but with the damping pad 50 omitted.

Figure 3:
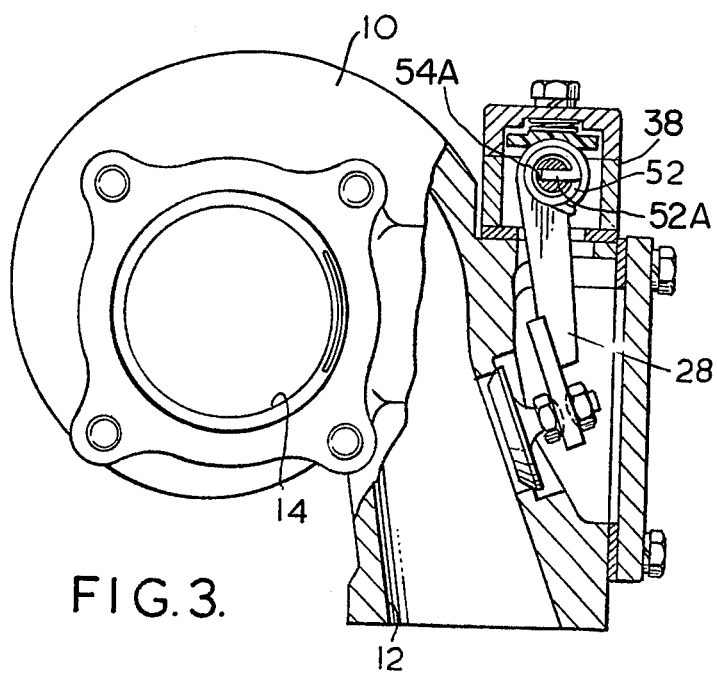
FIG. 3 is a partially sectioned side elevation of a second embodiment of a flow control valve constructed in accordance with the present invention and mounted on a turbocharger housing.
Figure 4:
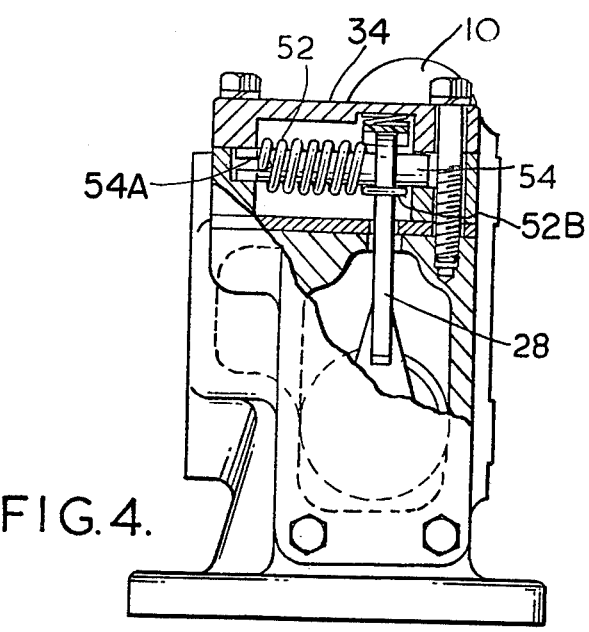
FIG. 4 is a front view of the embodiment of FIG. 3.

The embodiment of FIGS. 3 and 4 is substantially the same as that of FIGS. 1 and 2 but with the torsion bar replaced by a helical coil spring 52. The rocker arm 28 is pivotally mounted on a rod 54 extending coaxially through the spring 52. The spring 52 has a bent end 52A received in a slot 54A in one end of rod 54. The opposite end of spring 52 has another bent portion 52B extending over rocker arm 28. The spring 52 is stressed so as to bias the arm 28 clockwise, as viewed in FIG. 3. The rod 54 is fixed relative to housing 34 by a suitable arrangement (not shown). Examples of such an arrangement may be a pin extending through one of the ends of rod 54 and corresponding recesses in housing 34, as is apparent to those skilled in the art.

Figure 5:
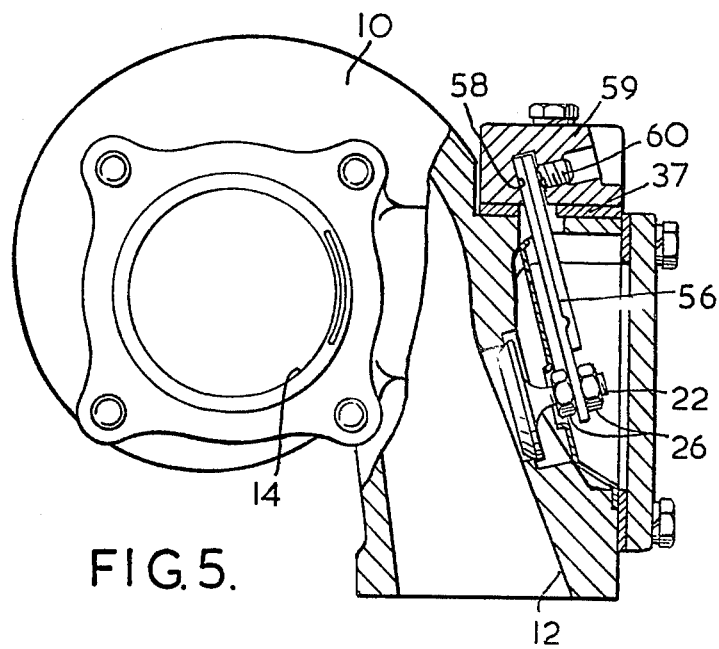
FIG. 5 is a partially sectioned side elevation of a third embodiment of a flow control valve constructed in accordance with the present invention and mounted on a turbocharger housing.
Figure 6:
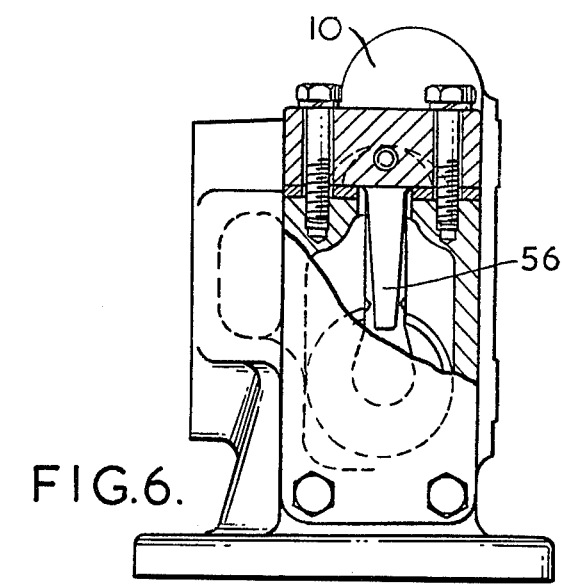
FIG. 6 is a partially sectioned front view of the embodiment of FIG. 5.

In the embodiment of FIGS. 5 and 6, the closure member is attached to one end of a leaf spring 56 by means of the stud 22 and the nuts 26, the other end of the leaf spring passing through the gasket 37 into a slot 58 in a block 59 where it is clamped by means of a grub-screw 60. The leaf spring advantageously comprises two leaves, the damping being obtained by inter-leaf friction.

Figure 7:
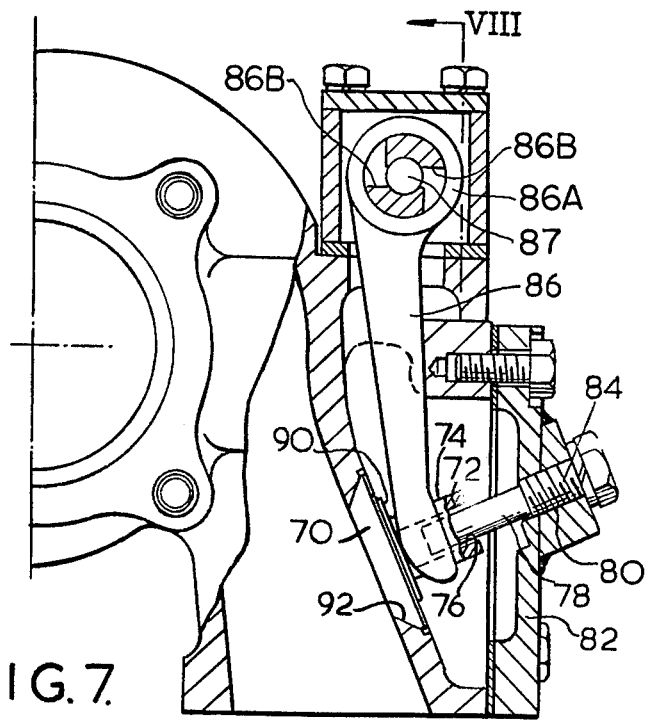
Figure 8:
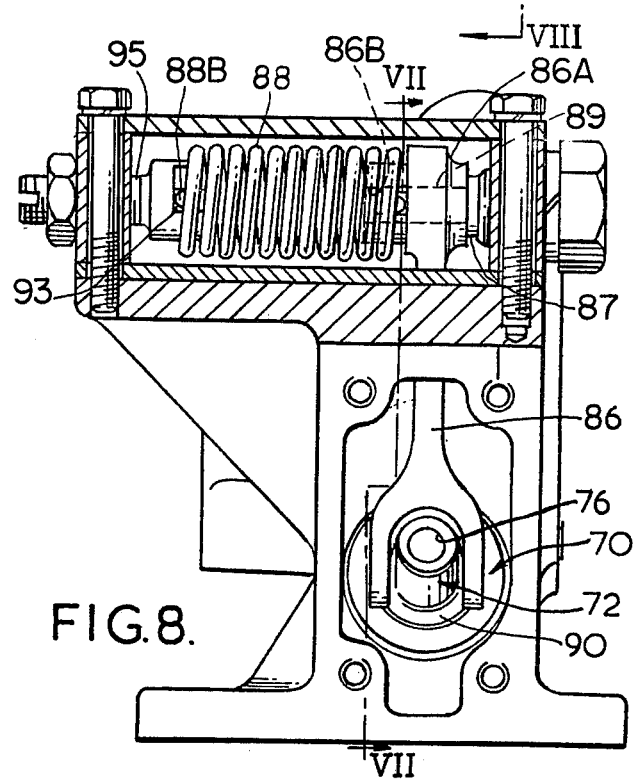
FIG. 8 is a partially sectioned front view of the embodiment of FIG. 7.

In the embodiment of FIGS. 7 and 8, the closure member is not rigidly connected to the rocker arm as is the case in the previously described embodiments. A modified closure member 70 is utilized in FIGS. 7 and 8 which includes an axially extending tubular stem 72 having a cylindrical outer surface 74 and a cylindrical inner surface 76 which defines an internal bore of the stem 72. The bore of the stem 72 is arranged to loosely receive the free end of a headed pin 78 which is rigidly located in a bore 80 in a cover plate 82 by means of a screwthreaded portion 84, the pin 78 and stem 72 being in substantial axial alignment. The valve includes pivotable rocker arm 86 whose upper end is spring biassed in a substantially identical manner to that of the embodiment of FIGS. 3 and 4. One end of rocker arm 86 has a base 86A having a central bore 86B journaled over a pin 87 integral with an element 89 threaded through one end wall of a chamber 91. Base 86A has a slot 86B which receives a bent end portion 88A of spring 88. The opposite end of spring 88 has a similar bent end 88B which is received in a slot 93 of an element 95 threaded into another end wall of chamber 91. Thus, spring 88 acts against housing 91 through portion 88B and against rocker arm 86 through portion 88B to bias arm 86 in a clockwise position as shown in FIG. 7. The end of the rocker arm 86 remote from its pivoting axis about pin 87 is, not rigidly connected to the closure member 70 but is bifurcated as shown in FIG. 8 so that the two arms of the bifurcation lie on opposite sides, respectively, of the stem 72 with a clearance therebetween. Due to the biassing action of the coil spring 88, the bifurcated end of the rocker arm 86 engages the rear surface 90 of the closure member 70 and urges the closure member into its closed position against a valve seat 92.

The aforegoing arrangement of FIGS. 7 and 8 has the advantage of allowing the closure member 70 a certain amount of lateral freedom of movement relative to the rocker arm 86 so that the closure member is self-seating in the valve seat 92, that is, it is not absolutely necessary for the axes of the valve seat 92 and closure member 70 to be precisely aligned. This overcomes problems which can be created by differential expansion of the various parts of the valve and any distortion of the parts which may occur in these parts when they become hot. As shown in FIG. 7, the pin is received in the bore of the stem 72 with a substantial clearance therebetween so that the co-operating surfaces of these parts are not strictly in a sliding relationship, the pin 78 merely acting as a loose guide for the stem 72. A considerable build-up of deposits on these co-operating surfaces can therefore be tolerated without detriment to the action of the valve.

Although in the embodiments of FIGS. 1 to 4 the rocker arm is shown connected to the closure member stem by way of an additional plate 24, the latter plate can be omitted and the rocker arm connected directly to the closure member. With the configurations presently illustrated, the rocker arm would obviously then have to be cranked.

All of the valves discussed above provide a highly effective control of turbine inlet gases. Furthermore, they do not appreciably affect the overall envelope of the turbine housing. This is a significant advantage in installations where space is at a premium.

I claim:

1. Apparatus comprising:

a turbine housing surrounding a rotatable turbine wheel, said turbine housing having a primary passage through which hot combustion gases pass to said turbine;

said turbine housing also having a valve seat formed in the wall of said primary passage and a bypass passage extending from said valve seat to a point downstream of said turbine wheel;

a valve closure member;

means connected to said turbine housing for defining a chamber therein connected to said bypass passage through an opening;

means for mounting said closure member for displacement between a first position in which said closure member engages said valve seat to block flow into said bypass passage and a second position in which it permits flow therethrough, said mounting means being adapted for substantially angular displacement about an axis positioned laterally of said closure member and within said chamber; and means for biassing said closure member towards said first position.

2. Apparatus as in claim 1 wherein:

said mounting means comprises a rocker arm having one end pivotally mounted about said axis in said chamber, said rocker arm extending through said opening for connection with said closure member;

said biassing means acts through said rocker arm for urging said closure member towards said first position.

3. Apparatus as in claim 2 wherein said biassing means comprises a helical spring positioned in said chamber and acting on said rocker arm.

4. Apparatus as in claim 3 wherein:

said mounting means further comprises a rod fixed to said housing, said rocker arm being pivotally mounted on said rod;

said helical spring is positioned over said rod and end fixed thereto and the other end fixed to said rocker arm.

5. Apparatus as in claim 2 wherein:

said mounting means further comprises a torsion bar having one end fixed to said rocker arm, said one end thereof being journalled in said housing, said biassing means comprises means for fixing the opposite end of said torsion bar to said housing with sufficient angular displacement relative to the first end for biassing said closure member towards said first position.

6. Apparatus as in claim 1 wherein said mounting means comprises a flexible elongated member having one end fixed to said housing and the free end thereof fixed to said closure member.

7. Apparatus as in claim 6 wherein said flexible member comprises a leaf spring biassed to urge said closure member toward said first position thereby defining said biassing means.

8. Apparatus as in claim 1 wherein said mounting means includes:

a rocker arm having one end pivotally mounted in said chamber and having the free end thereof extending through said opening and engaging said closure member;

said biassing means is positioned in said chamber and acts through said rocker arm to displace said closure member toward said first position.

9. Apparatus as in claim 8 wherein said mounting means further includes a tubular element and a guide pin element loosely received in said tubular element, one of said elements fixed to said closure member and the other of which fixed to said turbine housing in said bypass flow path for guiding movement of said closure member.

10. Apparatus as in claim 9 wherein said rocker arm has a bifurcated free end, the arms of the bifurcations lying on opposite sides of the element fixed to said closure member.

* * * * *